(12) United States Patent
Barnard et al.

(10) Patent No.: US 12,474,819 B2
(45) Date of Patent: Nov. 18, 2025

(54) STRUCTURED GRAPHICAL USER INTERFACE FOR PUBLIC SAFETY POLICY PROCEDURE MANAGEMENT

(71) Applicant: MOTOROLA SOLUTIONS, INC., Chicago, IL (US)

(72) Inventors: James C. Barnard, Naperville, IL (US); Daniel Studer, Hawthorn Woods, IL (US); Nathan D. Troup, Wyoming, MI (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 248 days.

(21) Appl. No.: 18/146,759

(22) Filed: Dec. 27, 2022

(65) Prior Publication Data

US 2024/0211098 A1 Jun. 27, 2024

(51) Int. Cl.
*G06F 3/0482* (2013.01)
*G06Q 50/26* (2024.01)

(52) U.S. Cl.
CPC ......... *G06F 3/0482* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 7,996,374 B1 | 8/2011 | Jones et al. | |
| 9,342,976 B2 | 5/2016 | Pfeffer | |
| 9,760,631 B1 * | 9/2017 | Broxton | G06Q 30/02 |
| 2013/0060603 A1 * | 3/2013 | Wagner | G06Q 30/0202 |
| | | | 705/7.29 |
| 2013/0247081 A1 * | 9/2013 | Vinson | H04N 21/254 |
| | | | 725/14 |
| 2015/0363518 A1 | 12/2015 | Edgington et al. | |

(Continued)

FOREIGN PATENT DOCUMENTS

WO 2002063492 A1 8/2002

OTHER PUBLICATIONS

Motorola Solutions, Inc., "Public Safety Command Center Software Suite," available at least as early as Mar. 29, 2018 <https://www.motorolasolutions.com/en_us/products/command-center-software.html> (5 pages).

*Primary Examiner* — Kiersten V Summers
(74) *Attorney, Agent, or Firm* — Michael Best & Friedrich LLP

(57) ABSTRACT

A method for generating a structured graphical user interface (GUI) for improving accuracy of determining violations of public safety policy procedure and effect of such violations on results of an incident includes collecting data pertaining to an incident response and identifying a current public safety policy procedure for an incident type of the incident response. The method also includes detecting one or more actions taken within the incident response falling outside the recommended actions of the current public safety policy procedure and generating a GUI listing a plurality of actions taken during the incident response. The method further includes displaying a recommended action of the current public safety policy procedure corresponding to the one or more actions taken adjacent the one or more actions taken in the GUI and providing a link to the recommended action adjacent the one or more actions taken in the GUI.

18 Claims, 6 Drawing Sheets

(56) References Cited

U.S. PATENT DOCUMENTS

| | | | |
|---|---|---|---|
| 2016/0203494 A1* | 7/2016 | Galligan Davila | G06Q 30/018 |
| | | | 705/317 |
| 2017/0277700 A1* | 9/2017 | Davis | G11B 27/28 |
| 2018/0100748 A1* | 4/2018 | Waniguchi | H04L 67/52 |
| 2018/0101923 A1* | 4/2018 | Griesmann | H04W 64/00 |
| 2018/0114081 A1* | 4/2018 | Dejewski | G06V 40/70 |
| 2020/0034001 A1* | 1/2020 | Frommelt | G06F 3/0482 |
| 2020/0042945 A1* | 2/2020 | Schuler | G06Q 50/26 |
| 2020/0265364 A1* | 8/2020 | Parham | G06Q 50/265 |
| 2020/0273046 A1* | 8/2020 | Biswas | G06N 3/08 |
| 2021/0191963 A1* | 6/2021 | Walton | G06F 16/34 |
| 2022/0101239 A1* | 3/2022 | Molter | G06Q 50/26 |

* cited by examiner

FIG. 6

Policy Audit-Post-Incident Analysis 600

Incident List [Traffic Stop ▽]
10/01/2022-13:01-South Chicago
10/01/2022-14:01-Schaumburg
10/01/2022-16:01-Oak Park
10/01/2022-19:01-Berwyn
10/01/2022-21:01-Chicago Ridge
10/02/2022-01:01-Logan Square
10/02/2022-03:01-Norridge
10/02/2022-04:01-Elk Grove Village
10/02/2022-19:01-Wood Dale
10/03/2022-05:01-Hinsdale
10/03/2022-09:01-Maywood
10/03/2022-14:01-Englewood
10/03/2022-17:01-Little Village
10/03/2022-18:01-Rogers Park  610
10/03/2022-19:01-Skokie
10/03/2022-21:01-Niles
10/04/2022-03:01-Arlington Heights
10/04/2022-04:01-Villa Park
10/04/2022-08:01-Burbank
10/04/2022-10:01-South Shore
10/04/2022-13:01-Chinatown Policy A20502 - Traffic Stop Procedure Date: 10/01/2022                Location:Berwyn
Time: 19:01                     Type: Traffic Stop
Officer: Smith,ID:10233         Policy Score: FAIL Incident Timeline:
19:01:00- Radar Detector Registers 89MPH
19:02:00-Police Car Lights Enabled
19:03:00-Officer Radios To Dispatcher
19:04:00-Officer Searches For Plate Number-Link To Lookup Data
19:05:00-Officer Exits Vehicle-Link To Street Cam
19:06:00-Body Cam Not Activated
19:07:00-Contact Made With Driver
19:08:00-Officer Identifies Himself And Reason For Contact-Link To Lookup Data
19:09:00-License/Registration Lookup At Computer-Link To Lookup Data
19:10:00-Loud Argument Identified-Link To Dashcam Video-Link To Transcript
19:11:00-Gun Holster Sensor-Gun Removed
19:12:00- Elevated Heart rate Detected-Link To Biometric Data 620 Policy Warning 108: Radio Contact Must Always Be Made Before Proceeding-Link 650 Policy Error 542: Body Cam Must Always Be Activated Before Exiting Vehicle-Link Policy Error 102: Weapon Removed Without Provocation-Link

630

Policy Compliance Statistics
25%-Policy Error
40%-Policy Warnings                  640

Most Common Error:
542: Body Cam Not Activated

Most Common Warning:
108: Delay Radio Contact

STRUCTURED GRAPHICAL USER INTERFACE FOR PUBLIC SAFETY POLICY PROCEDURE MANAGEMENT

BACKGROUND OF THE INVENTION

Public safety institutions maintain public safety policy procedures. These procedures outline recommended actions public safety personnel should take in response to certain situations. A public safety institution is, for example, a police department, a fire department, an emergency medical services department, or the like. Public safety personnel include, for example, police officers, first responders, paramedics, emergency medical technicians, administrative staff, supervisory staff, and/or the like.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments, examples, aspects, and features that include the claimed subject matter, and explain various principles and advantages of aspects of those embodiments, examples, aspects, and features.

FIG. 6 is an example graphical user interface generated by the system of FIG. 1 and method of FIGS. 4 and 5 in accordance with some examples.

Figure 1:
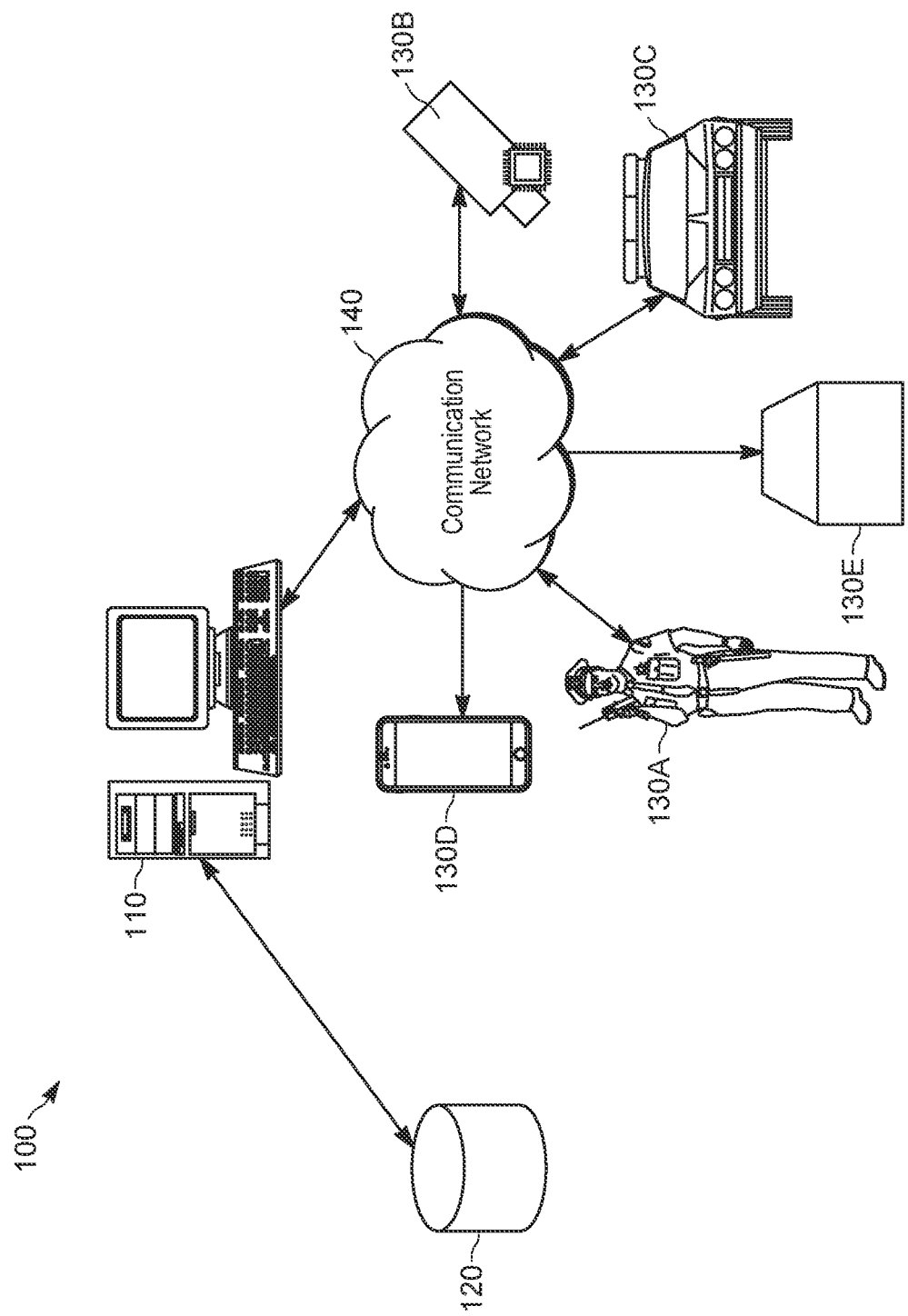
FIG. 1 is a block diagram of a system for managing policy procedures of public safety institutions in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples disclosed herein.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

DETAILED DESCRIPTION OF THE INVENTION

Policy procedures and best practices for many public safety institutions are complex and nuanced. Regular reviews and updates of these policies are tedious and inefficient. However, the policies and best practices still need to be aligned to an evolving world. More importantly, there is a problem in presenting information to accurately identify the public safety policy procedure being violated and the results of such violation to determine whether a change of current public safety policy procedure is needed.

Accordingly, there is a need for a specific, structured graphical user interface to accurately identify public safety policy procedures being violated and the results of such violations to determine whether a change of current public safety policy procedure is needed.

One example provides a system for generating a specific, structured graphical user interface for improving accuracy of determining violations of public safety policy procedure and effect of such violations on results of an incident. The system includes a computer including a non-transitory computer-readable medium storing instructions, and an electronic processor configured to execute the instructions. The electronic processor is configured to collect data pertaining to an incident response from an incident response device and generate a graphical user interface including a first window and a second window on a display. The electronic processor is also configured to display a list of incident responses including the incident response in the first window and receive a first selection of the incident response in the first window. The electronic processor is further configured to display a list of actions taken in the incident response in the second window in response to receiving the first selection and identify, in the second window, one or more actions taken falling outside a current public safety policy procedure for an incident type of the incident response from the list of actions taken. The electronic processor is also configured to provide, in the second window, a link to a recommended action of the current public safety policy procedure corresponding to the one or more actions taken.

Another example provides a method for generating a specific, structured graphical user interface for improving accuracy of determining violations of public safety policy procedure and effect of such violations on results of an incident. The method includes collecting, using an electronic processor, data pertaining to an incident response from an incident response device and determining, using the electronic processor, an incident type of the incident response based on the data. The method also includes identifying, using the electronic processor, a current public safety policy procedure for the incident type. The current public safety policy procedure includes recommended actions to take in response to incident parameters associated with the incident type. The method further includes detecting, using the electronic processor, one or more actions taken within the incident response falling outside the recommended actions of the current public safety policy procedure and generating a graphical user interface listing a plurality of actions taken during the incident response. The one or more actions taken are a subset of the plurality of actions taken. The method also includes displaying, in the graphical user interface, a recommended action of the current public safety policy procedure corresponding to the one or more actions taken adjacent the one or more actions taken in the graphical user interface and providing, in the graphical user interface, a link to the recommended action adjacent the one or more actions taken in the graphical user interface.

Another example provides a command server for generating a specific, structured graphical user interface for improving accuracy of determining violations of public safety policy procedure and effect of such violations on results of an incident. The command server includes a transceiver configured to communicate with an incident response device, a memory storing current public safety policy procedures for a plurality of incident types, and an electronic processor electrically coupled to the transceiver and the memory. The electronic processor is configured to collect data pertaining to an incident response from the incident response device and determine an incident type of the incident response based on the data. The electronic processor is also configured to identify a current public safety policy procedure for the incident type. The current public safety policy procedure includes recommended actions to take in response to incident parameters associated with the incident type. The electronic processor is further configured to detect one or more actions taken within the incident response falling outside the recommended actions of the current public safety policy procedure and generate a graphical user interface listing a plurality of actions taken during the incident response. The one or more actions taken are a subset of the plurality of actions taken. The electronic processor is also configured to display, in the graphical user interface, a recommended action of the current public safety policy procedure corresponding to the one or more actions taken adjacent the one or more actions taken in the graphical user interface and provide, in the graphical user interface, a link to the recommended action adjacent the one or more actions taken in the graphical user interface.

With reference to FIG. 1, a system 100 for generating a specific, structured graphical user interface for improving accuracy of determining violations of public safety policy procedure and effect of such violations on results of an incident includes a command server 110, policy procedures data sources 120, and a plurality of incident response devices 130A-E. The plurality of incident response devices 130A-E communicate with the command server 110 over a communication network 140. The system 100 may include more or fewer components than those illustrated in FIG. 1 and may perform additional functions other than those described herein. The command server 110 is a computing device implemented in a cloud infrastructure or located at an intelligence center or other location of a public safety institution. The intelligence center is, for example, a control point for coordinating an incident response (for example, a real time crime center (RTCC), a dispatch center, campus security center, and the like). The policy procedures data sources 120 include, for example, databases of the public safety institution(s) storing the current public safety policy procedures for a plurality of incident types. The plurality of incident response devices 130A-E include, for example, body worn devices of a first responder 130A (for example, a public safety officer body-worn camera, a portable two-way radio, public safety officer biometric sensors, and the like), fixed video cameras or sensors 130B (for example, surveillance cameras, traffic cameras, and the like) devices in vehicles responding to an incident 130C (for example, a public safety vehicle dashboard camera, a mobile two-way radio, and the like), smart telephones of responding officers or citizens 130D, public safety sensors 130E (for example, public safety weapon sensors, environmental sensors, traffic sensors, and the like), and the like. The plurality of incident response devices 130A-E may be singularly referred to as an incident response device 130.

Figures 2, 3:
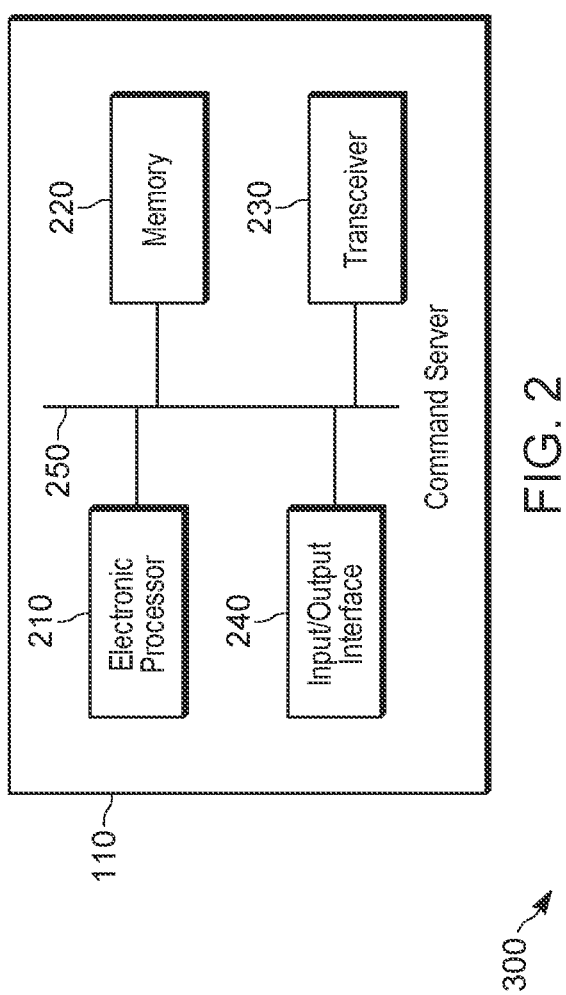
FIG. 2 is a block diagram of a command server of the system of FIG. 1 in accordance with some examples.
FIG. 3 is an example current public safety policy procedure of public safety institutions in accordance with some examples.

FIG. 2 is a block diagram of one example of the command server 110. In the example illustrated, the command server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example of the command server 110. The command server 110 may include more or fewer components and may perform functions other than those explicitly described herein.

In some examples, the electronic processor 210 is implemented as a microprocessor with separate memory, such as the memory 220. In other examples, the electronic processor 210 may be implemented as a microcontroller (with memory 220 on the same chip). In other examples, the electronic processor 210 may be implemented using multiple processors. In addition, the electronic processor 210 may be implemented partially or entirely as, for example, a field-programmable gate array (FPGA), an applications specific integrated circuit (ASIC), an x86 processor, and the like and the memory 220 may not be needed or be modified accordingly. In the example illustrated, the memory 220 includes non-transitory, computer-readable memory that stores instructions that are received and executed by the electronic processor 210 to carry out the functionality of the command server 110 described herein. The memory 220 may include, for example, a program storage area and a data storage area. The program storage area and the data storage area may include combinations of different types of memory, such as read-only memory and random-access memory. In some embodiments, the command server 110 may include one electronic processor 210, and/or a plurality of electronic processors 210 in a cloud computer cluster arrangement, one or more of which may be executing none, all, or a portion of the applications or instructions of the command server 110 provided below, sequentially or in parallel across the one or more electronic processors 210. The one or more electronic processor 210 comprising the command server 110 may be geographically co-located or may be separated (for example, by miles), and interconnected via electronic and/or optical interconnects. One or more proxy servers or load balancing servers may control which one or more electronic processors 210 perform any part or all of the applications provided below.

The transceiver 230 enables wired and/or wireless communication between the command server 110 and the plurality of incident response devices 130 over the communication network 140. In some examples, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

In the example illustrated in FIG. 2, a single device is illustrated as including all the components and the applications of the command server 110. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the command server 110 are implemented in a cloud infrastructure accessible through several terminal devices, with the processing power located at a server location. In another example, the components and applications of the command server 110 may be divided between separate intelligence center computing device and dispatch device co-located at an intelligence center or dispatch center of a responding organization (e.g., a police department). In yet another example, the components and applications of the command server 110 may be divided between separate computing devices not co-located with each other but communicatively connected with each other over a suitable communication network.

FIG. 3 illustrates an example current public safety policy procedure 300. The current public safety policy procedure 300 is specific to an incident type. In the example illustrated, the current public safety policy procedure relates a plurality of recommended actions to one or more incident parameters using a table. In other examples, the recommended action may be related to incident parameters using other relational tools. The current public safety policy procedure 300 may also be related to incident types in the policy procedures data sources 120. The incident types include, for example, a fire incident, a crime incident, a medical incident, a traffic incident, and other public safety incidents. The recommended actions include, for example, turning on body-worn camera, reciting Miranda rights, performing concussion evaluation, wearing appropriate personal protective equipment, and the like. The incident parameters related to the recommended action include, for example, one or multiple suspects being approached, traffic level at traffic stop, visibility at traffic stop, multiple injuries, flammable substances present, dangerous chemicals present, and the like.

Figure 4:
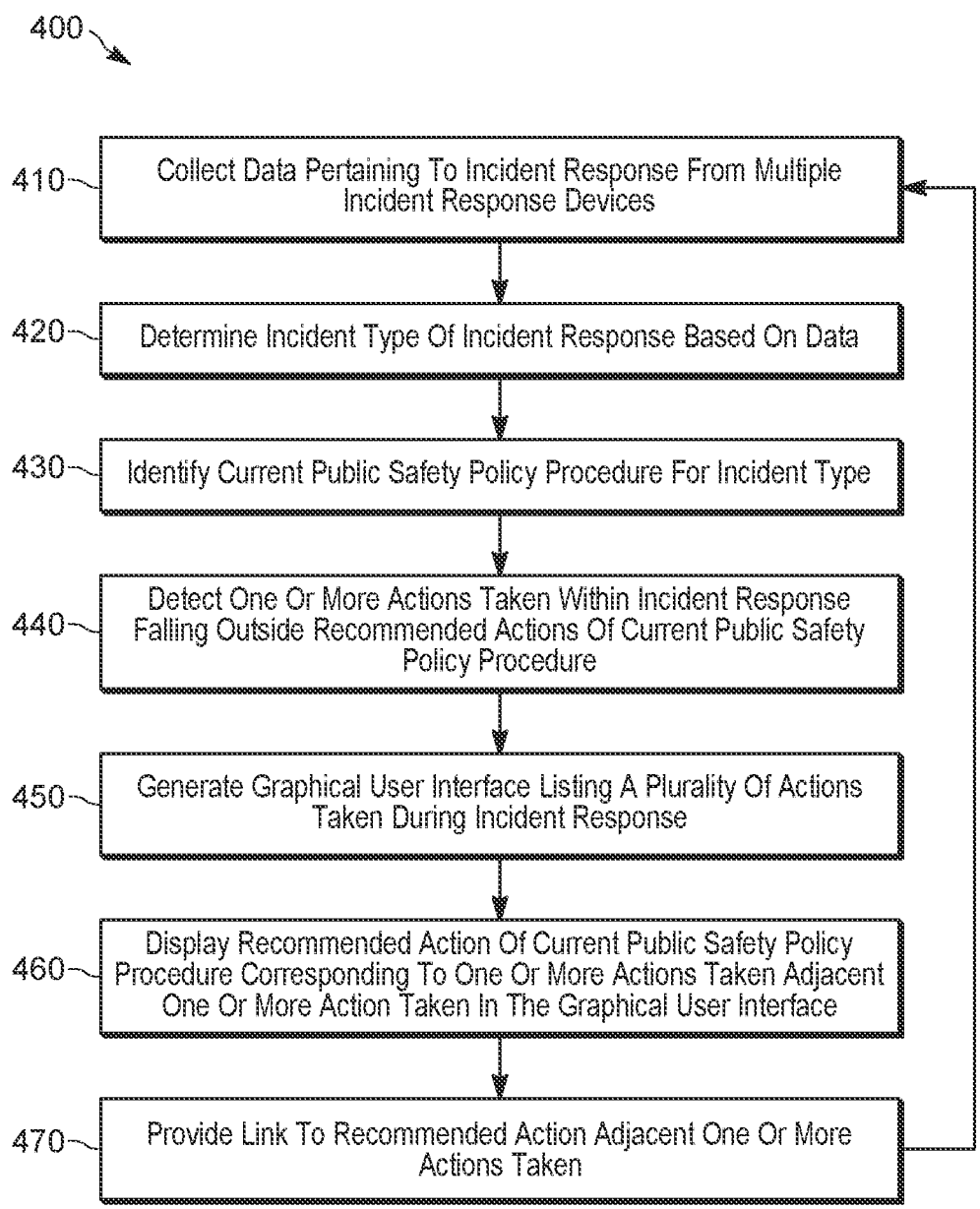
FIG. 4 is a flowchart of a method for managing policy procedures of public safety institutions in accordance with some examples.

FIG. 4 is a flowchart of an example method 400 for generating a specific, structured graphical user interface for improving accuracy of determining violations of public safety policy procedure and effect of such violations on results of an incident. The method 400 includes collecting, using the electronic processor 210, data pertaining to an incident response from an incident response device 130 (at block 410). Public safety personnel, vehicles, and equipment are dispatched to an incident scene to respond to an incident (for example, a fire incident, a crime incident, or the like). Incident response includes the response provided by the various public safety personnel, vehicles, or equipment for the incident. The various incident response devices 130 record data relating to the incident response. The command server 110 communicates, using the transceiver 230, with the incident response devices 130 to collect the recorded data. The data may be collected in real time, at certain intervals during the incident, or post incident response. The data can include text communications, video data, audio data, public safety biometric data, weapon data, weather/environmental data, traffic data, and the like. The data may be collected from a plurality of incident response devices 130.

The method 400 includes determining, using the electronic processor 210, an incident type of the incident response based on the data (at block 420). The electronic processor 210 may analyze the collected data to determine the incident type. As noted above, the incident types include, for example, a fire incident, a crime incident, a medical incident, a traffic incident, and other public safety incident. In one example, the incident type may be detected based on detecting a type of public safety personnel, vehicle, or equipment detected in a video captured during incident response. The method 400 also includes identifying, using the electronic processor 210, a current public safety policy procedure 300 for the incident type (at block 430). The electronic processor 210 may retrieve the current public safety policy procedure corresponding to the incident type from the policy procedures data sources 120. As shown in FIG. 3, the current public safety policy procedure includes recommended actions to take in response to incident parameters associated with the incident type.

The method 400 includes detecting, using the electronic processor 210, actions taken within the incident response falling outside the recommended actions of the current public safety policy procedure (at block 440). The electronic processor 210 analyzes the collected data from multiple incident response devices 130 to determine all the actions taken during the incident response. The electronic processor 210 may compare all of the actions taken to the recommended actions in the current public safety policy procedure to determine the actions taken within the incident response falling outside the recommended actions of the current public safety policy procedure. The electronic processor 210 may use image and/or video analysis techniques, audio analysis techniques, natural language processing techniques, and/or the like on the collected data to detect the actions taken during incident response. The electronic processor 210 may also analyze text communications, for example, to extract keywords from the collected data to detect the actions taken during incident response. Actions falling outside a recommended action include, for example, failing to turn on a body-worn camera, failing to place appropriate number of traffic cones, failing to evaluate for concussion symptoms, discharging weapon without announcement, and the like.

The method 400 includes generating, using the electronic processor 210, a graphical user interface listing a plurality of actions taken during incident response (at block 450). The one or more actions taken are a subset of the plurality of actions taken. One example of the graphical user interface generated by the electronic processor 210 is illustrated in FIG. 6 and described below. The plurality of actions taken may be displayed in the order the actions were taken. A timestamp may be provided for each of the plurality of actions taken.

The method 400 includes displaying, in the graphical user interface, a recommended action of the current public safety policy procedure corresponding to the one or more actions taken adjacent the one or more actions taken in the graphical user interface (at block 460). The electronic processor 210 determines whether any recommended actions correspond to the one or more actions taken. The recommended actions corresponding to the one or more actions taken can be determined based on the contextual or incident parameters detected just before or during the one or more actions taken. For example, the electronic processor 210 may determine that a public safety officer did not activate a body-worn camera after exiting the public safety vehicle during a traffic stop. The electronic processor 210 may identify the recommended action for the action taken (that is, not activating the body-worn camera) as a body-worn camera always being activated before approaching a stopped vehicle during a traffic stop. The electronic processor 210 displays the recommended action adjacent the one or more actions taken within the graphical user interface.

The method 400 includes providing, in the graphical user interface, a link to the recommended action adjacent the one or more actions taken (at block 470). The link may include an address or the location of the current public safety policy procedure in the policy procedures data sources 120. When a user clicks on the link, the user is directed to the recommended action within the current public safety policy procedure. The link is provided within the graphical user interface adjacent the one or more actions taken and/or the recommended action to ease understanding of the information provided to a public safety officer.

Figure 5:
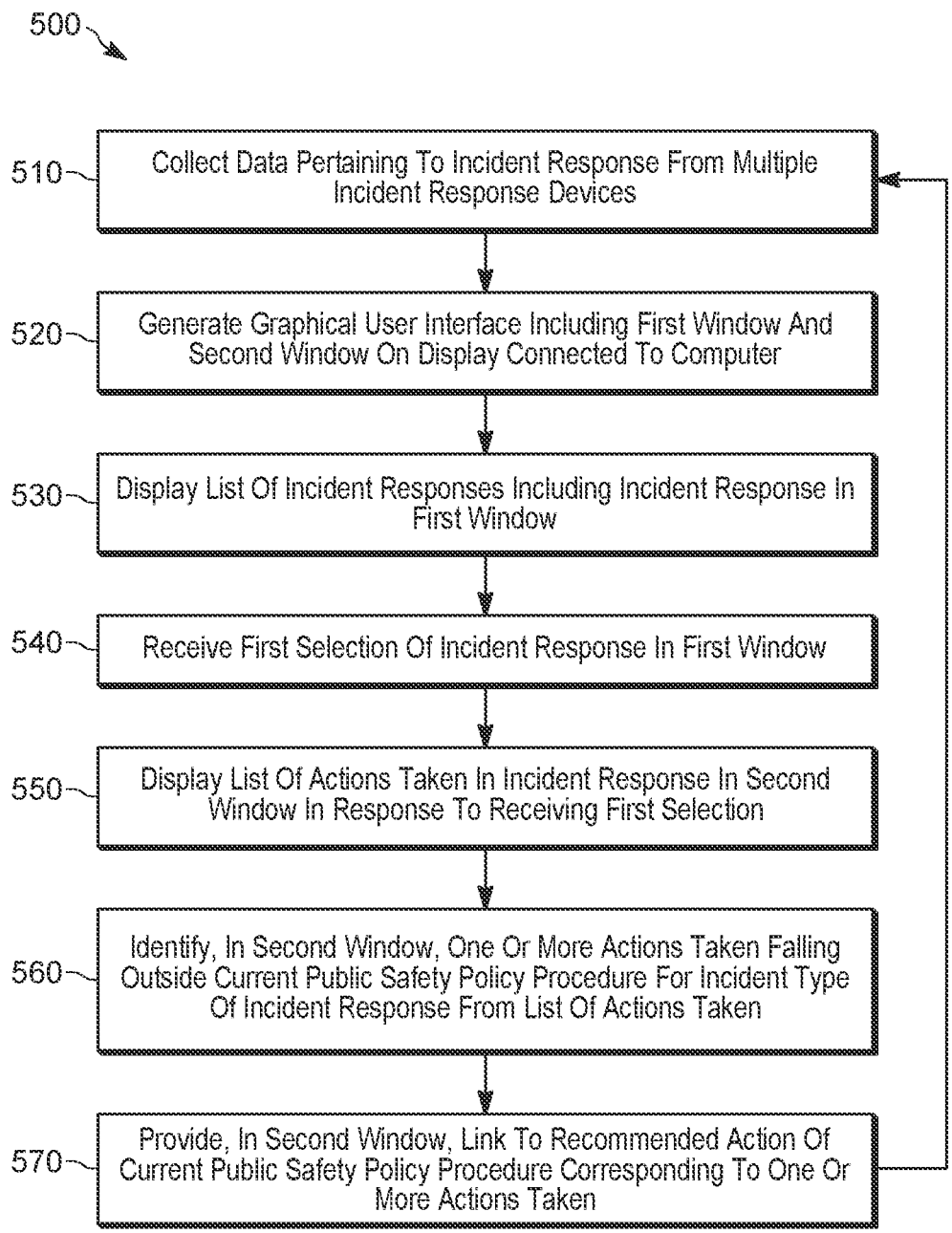
FIG. 5 is a flowchart of a method for generating a graphical user interface in accordance with some examples.

FIG. 5 is a flowchart of an example method 500 for generating a specific, structured graphical user interface for improving accuracy of determining violations of public safety policy procedure and effect of such violations on results of an incident. The method 500 includes collecting, using the electronic processor 210, data pertaining to an incident response from an incident response device 130 (at block 510). Public safety personnel, vehicles, and equipment are dispatched to an incident scene to respond to an incident (for example, a fire incident, a crime incident, or the like). Incident response includes the response provided by the various public safety personnel, vehicles, or equipment for the incident. The various incident response devices 130 record data relating to the incident response. The command server 110 communicates, using the transceiver 230, with the incident response devices 130 to collect the recorded data. The data may be collected in real time, at certain intervals during the incident, or post incident response. The data may be collected from a plurality of incident response devices 130.

The method 500 includes generating, using the electronic processor 210, a graphical user interface including a first window and a second window on a display connected to the computer (at block 520). One example of the graphical user interface generated by the electronic processor 210 is illustrated in FIG. 6 and described below. As shown in FIG. 6, the graphical user interface 600 includes a first window 610, a second window 620, a third window 630, and a fourth window 640. The first window 610 and the second window 620 are provided adjacent each other in the graphical user interface 600. The third window 630 is provided below the second window 620 and the fourth window 640 is provided below the first window 610 in the graphical user interface 600.

Returning to FIG. 5, the method 500 includes displaying a list of incident responses including the incident response in the first window 610 (at block 530). The list of incident responses may include all the incident responses over a time period performed by the public safety institution. The list of incident responses may be filtered based on the type of incident. Each incident response may be stamped with a data, time, and location of the incident. Some of the incident responses are highlighted in the first window 610. For example, incident responses having policy warnings or violations are highlighted (for example, in orange or red).

The method 500 includes receiving a first selection of the incident response in the first window 610 (at block 540). A user may select an incident response by clicking on the incident response in the first window 610. The method 500 includes displaying a list of actions taken in the incident response in the second window 620 in response to receiving the first selection (at block 550). When an incident response is selected, the list of actions taken in the incident response are displayed in the second window 620 in the graphical user interface 600. The electronic processor 210 analyzes the collected data from multiple incident response devices 130 to determine all the actions taken during the incident response. The electronic processor 210 may use image and/or video analysis techniques, audio analysis techniques, natural language processing techniques, and/or the like on the collected data to detect the actions taken during incident response. The electronic processor 210 may also analyze text communications, for example, to extract keywords from the collected data to detect the actions taken during incident response. The list of actions may be displayed in a timeline in the order the actions were taken. Each action may be stamped with the time the action was taken and with a label or brief description of the action taken.

The method 500 includes identifying, in the second window 620, one or more actions taken falling outside a current public safety policy procedure for the incident type of the incident response from the list of actions taken (at block 560). The electronic processor 210 may compare all of the actions taken to the recommended actions in the current public safety policy procedure to determine the actions taken within the incident response falling outside the recommended actions of the current public safety policy procedure. The one or more actions may be identified by highlighting these actions (for example, in orange or red) in the second window 620. The recommended actions corresponding to the one or more actions taken can be determined based on the contextual or incident parameters detected just before or during the one or more actions taken. The electronic processor 210 displays the recommended action adjacent the one or more actions taken within the graphical user interface 600. In one example, the recommended action is displayed in a policy call out box 650 adjacent the one or more actions taken.

The method 500 includes providing, in the second window 620, a link to the recommended action of the current public safety policy procedure corresponding to the one or more actions taken (at block 570). The link may include an address or the location of the current public safety policy procedure in the policy procedures data sources 120. When a user clicks on the link, the user may be directed to the recommended action within the current public safety policy procedure. The link may be provided within the policy call out box 650 adjacent the recommended action and the one or more actions taken.

FIG. 6 illustrates an example graphical user interface 600 generated by the electronic processor 210. The graphical user interface 600 includes a first window 610, a second window 620, a third window 630, and a fourth window 640. The first window 610 and the second window 620 are provided adjacent each other in the graphical user interface 600. The third window 630 is provided below the second window 620 and the fourth window 640 is provided below the first window 610 in the graphical user interface 600.

The first window 610 displays a list of incident responses of the public safety institution. The list of incident responses may be filtered based on the type of incident. The list of incident responses may be stamped with the data, time, and location of the incident. The second window 620 displays a list of actions taken during the incident response selected in the first window 610. The list of actions taken may be stamped with the time and a brief description of the action taken. In some examples, a link may be provided to a data file, an audio file, a video file, or the like relating to the action taken. For example, a link may be provided to a video file of a video captured by a vehicle dashboard camera of the action taken. Each of the list of actions taken may be analyzed to determine whether they correspond to recommended actions of the current public safety policy procedure for the incident type. One or more actions taken that fall outside the recommended actions may be highlighted in the second window 620. A policy call out box 650 is provided corresponding to the one or more highlighted actions taken adjacent the one or more highlighted actions taken. The policy call out box 650 describes the policy warning or violation by listing the recommended action corresponding to the one or more highlighted actions taken. A link to the recommended action of the current public safety policy procedure may be provided in the policy call out box 650. In some examples, the policy call out box 650 also additionally includes a link to a specific training to be provided to a public safety officer performing the action taken that violates the current public safety policy procedure. In some examples, the electronic processor 210 displays a map of a location of the incident response in the second window 620.

The electronic processor 210 may receive a second selection of an action taken from the list of actions taken in the second window 620. In response, the electronic processor 210 displays portions of the data from the incident response relating to the selected action taken in the third window 630. For example, the third window 630 displays an image or video of the selected action taken. The electronic processor 210 may also display biometric information, for example, a heart rate, respiration rate, body temperature, or the like of a public safety officer performing the action taken in the third window 630. The fourth window 640 displays policy violation information relating to the list of incident responses. The policy violation information may include the number or percentage of actions taken that have policy warnings or that violate current public safety policy procedure. The policy violation information may also include the most common policy violation and/or the most common policy warning. This policy violation information may be used by the public safety institution to determine whether any particular training should be instituted for the public safety institution. The graphical user interface 600 allows for accurate identification of the appropriate current public safety policy procedure and/or a recommended action of the appropriate current public safety policy procedure. By presenting the information in such a way in the graphical user interface 600, a user can accurately determine what policy violations are occurring and the result of such policy violations. When a policy violation provides a good result, such an action may need to be incorporated into the current public safety policy procedure. The structured graphical user interface 600 allows a user to accurately determine which outdated policy procedures are to be updated and which specific training is to be provided to prevent violation of non-outdated policy procedures or recommended actions.

Figure 7:
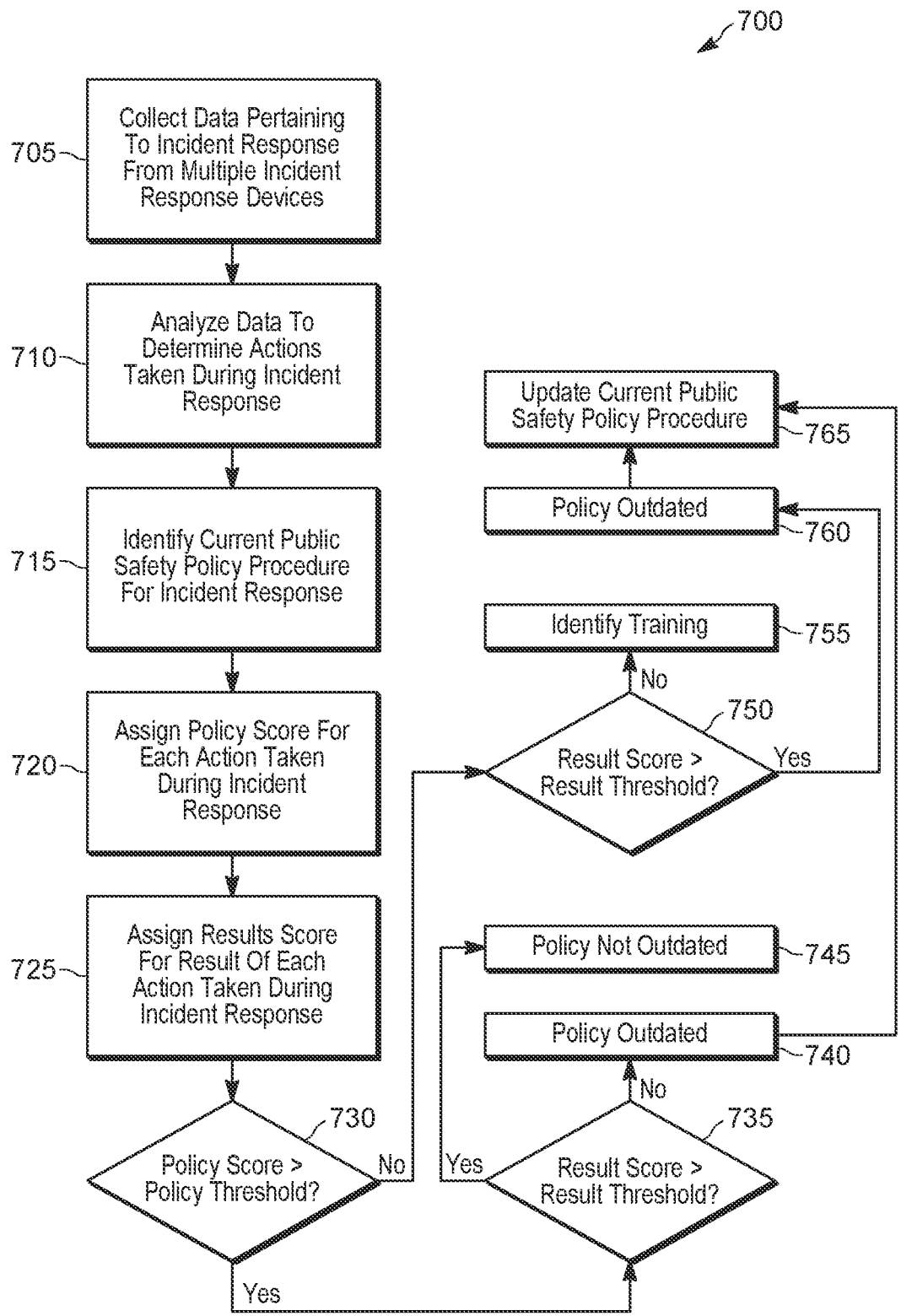
FIG. 7 is a flowchart of a method for analyzing an incident response by the system of FIG. 1 in accordance with some examples.

FIG. 7 is a flowchart of an example method 700 for analyzing an incident response. In the example illustrated, the method 700 includes collecting, using the electronic processor 210, data pertaining to an incident response from an incident response device 130 (at block 705). Public safety personnel, vehicles, and equipment are dispatched to an incident scene to respond to an incident (for example, a fire incident, a crime incident, or the like). Incident response includes the response provided by the various public safety personnel, vehicles, or equipment for the incident. The various incident response devices 130 record data relating to the incident response. The command server 110 communicates, using the transceiver 230, with the incident response devices 130 to collect the recorded data. The data may be collected in real time, at certain intervals during the incident, or post incident response.

The method 700 includes analyzing, using the electronic processor 210, the data to determine actions taken during incident response (at block 710). The electronic processor 210 analyzes audio, video, image, and/or other data received from multiple incident response devices 130 to determine the actions taken. For example, the electronic processor 210 may analyze the data to determine whether a body-worn camera is turned on and at what point of time during the incident response the body-worn camera was turned on. The electronic processor 210 may provide a timestamp for each action taken during the incident response.

The method 700 includes identifying, using the electronic processor 210, a current public safety policy procedure for the incident response (at block 715). The electronic processor 210 may identify the applicable current public safety policy procedure based on collected data. In one example, the electronic processor 210 determines the incident type of the incident response and retrieves the current public safety policy procedure for the determined incident type. In another example, the electronic processor 210 uses keywords from the collected data to identify and retrieve the appropriate current public safety policy procedure for the incident response.

The electronic processor 210 determines whether the actions taken correspond to or fall outside the recommended actions of the current public safety policy procedure. In one example, the method 700 includes assigning a policy score for each action taken during the incident response (at block 720). The electronic processor 210 compares each action taken to recommended actions within the current public safety policy procedure to determine compatibility or correspondence with the recommended actions. Each action taken is then assigned a policy score based on how closely the action taken relates to the recommended action. In one example, actions taken may be rated on a scale of 100 with a fully compliant action being awarded a score of 100. For example, when a body-worn camera is turned on at the appropriate time, the action taken may be awarded 100. If the body-worn camera is not turned on for the duration of the incident, the action taken may be awarded 0. If the body-worn camera is turned on but after the appropriate time, the action taken may be awarded a score of 50. In other examples, different methods may be used to determine whether the actions taken correspond to or fall outside the recommended actions. In some examples, the policy score may be displayed in the graphical user interface 600, for example, adjacent the corresponding action taken.

The electronic processor 210 determines whether one or more results of one or more actions taken fall within an acceptable results range. In one example, the method 700 includes assigning a results score for a result of each action taken during the incident response (at block 725). In some examples, only the final result of the incident response may be used and scored. In other examples, final and intermediary results may be used and scored. The result may be determined based on analysis of the data received from the incident response devices 130. The electronic processor 210 may assign the results score based on how close the achieved result is to a desired result. In some examples, the results score may be displayed in the graphical user interface 600, for example, adjacent the corresponding action taken. The results score may be assigned similarly a the policy score based on the outcome of the actions taken or the of the incident response.

The blocks 730-760 may be performed for each action taken. For each action taken, the method 700 includes determining whether the policy score of the action taken is greater than a policy threshold (at block 730). When the policy score is greater than the policy threshold, the electronic processor 210 may determine that the action taken corresponds to a recommended action of the current public safety policy procedure. When the policy score is less than the policy threshold, the electronic processor 210 determines that the action taken falls outside recommended actions of the current public safety policy procedure. The policy threshold may be an arbitrary number assigned by the public safety institution. For example, for a scale of 100, the policy threshold can be assigned as 70.

When the policy score is greater than the policy threshold, the method 700 includes determining whether the result score is greater than a result threshold (at block 735). The result threshold may be an arbitrary number assigned by the public safety institution. For example, for a scale of 100, the result threshold can be assigned as 70. When the current public safety policy procedure is followed and the desired result is achieved, the method 700 determines that the current public safety policy procedure and/or a recommended action of the current public safety policy procedure is not outdated (at block 740). When the current public safety policy procedure is followed but the desired result is not achieved, the method 700 determines that the current public safety policy procedure and/or the recommended action of the current public safety policy procedure is outdated (at block 745).

When the policy score is less than the policy threshold, the method 700 includes determining whether the result score is greater than a result threshold (at block 750). When the current public safety policy procedure is not followed and the desired result is not achieved, the method 700 includes identifying a training to be provided to a public safety officer taking the one or more actions taken (at block 755). The training can be identified in a policy call out box 650 or a separate call out box of the graphical user interface 600 and is provided adjacent the one or more actions taken. When the current public safety policy procedure is not followed but the desired result is achieved, the method 700 includes identifying the current public safety policy procedure and/or the recommended action of the current public safety policy procedure corresponding to the one or more actions taken as being an outdated policy and/or outdated action (at block 760).

When the method 700 determines that the current public safety policy procedure and/or a recommended action of the current public safety policy procedure is outdated (at blocks 740 and 760), the method 700 includes updating, using the electronic processor 210, the current public safety policy procedure (at block 765). The electronic processor 210 may update the current public safety policy procedure to replace a recommended action with an action taken for which a desired result was achieved.

In some examples, the electronic processor 210 determines contextual parameters associated with the one or more actions taken. Contextual parameters include parameters that lead to the actions taken, for example, parameters recorded immediately preceding or during the actions taken. Contextual parameters include, for example, a location of the incident, an experience of a public safety officer corresponding the incident type, a training associated with a public safety officer dispatched to the incident response, public safety officer biometric information, weather/environment information, traffic information, and the like. The electronic processor 210 also determines whether a correlation exists between the contextual parameters and the one or more actions taken across multiple incident responses. The electronic processor 210 compares the contextual parameters detected for the actions taken falling outside the recommended actions for the current incident response to contextual parameters detected for similar or dissimilar actions taken falling outside the recommended actions for other incident responses. Based on the comparison, the electronic processor 210 may determine whether any correlation exists between the contextual parameters and similar actions taken during various incident responses.

In these examples, the electronic processor 210 identifies a recommended action of the current public safety policy procedure corresponding to the one or more actions taken as being an outdated action based on the correlation existing between the contextual parameters and the actions taken (for example, at block 740 and/or 760). The electronic processor 210 determines whether any recommended actions correspond to the contextual parameters or the actions taken falling outside the recommended actions. The electronic processor 210 identifies these recommended actions as being outdated actions. The electronic processor 210 updates the current public safety policy procedure to include the contextual parameter as an incident parameter relating to the recommended action (for example, at block 765). The electronic processor 210 may display the updated current public safety policy procedure in the graphical user interface 600 highlighting the changes made to the current public safety policy procedure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for generating a structured graphical user interface for improving accuracy of determining violations of public safety policy procedure and an effect of such violations on results of an incident, the system comprising:
   a computer including a non-transitory computer-readable medium storing instructions, and an electronic processor configured to execute the instructions to:
      generate a graphical user interface including a first window, a second window, and a third window on a display, wherein the first window is displayed adjacent the second window and the third window is displayed below the second window in the graphical user interface,
      display a list of incident responses in the first window, the list of incident responses including a first time-stamped list of a plurality of incident responses performed over a time period,
      receive a first user selection of an incident response from the list of incident responses in the first window,
      display a list of actions taken in the incident response in the second window in response to receiving the first user selection, the list of actions taken including a second time stamped list of a plurality of actions taken in the incident response,
      generate, in the second window, one or more callout boxes including a pointer to one or more actions taken falling outside a current public safety policy procedure for an incident type of the incident response from the list of actions taken, the one or more callout boxes sized to fit within the second window,
      provide, in the one or more callout boxes, a link to an address of a recommended action of the current public safety policy procedure corresponding to the one or more actions taken,
      receive a second user selection of an action taken from the list of actions taken,
      display video data relating to the action taken in the third window in response to the second user selection, and
      display biometric information of a public safety officer performing the action taken in the third window adjacent the video data in response to the second user selection.

2. The system of claim 1, wherein the electronic processor is further configured to:
   determine whether one or more results of the one or more actions taken fall within an acceptable results range,
   identify the recommended action of the current public safety policy procedure corresponding to the one or more actions taken as being an outdated action based on the one or more results falling within the acceptable results range, and
   identify a training to be provided to a public safety officer taking the one or more actions taken when the one or more results of the one or more actions taken does not fall within the acceptable results range.

3. The system of claim 1, wherein the electronic processor is further configured to:
   determine contextual parameters associated with the one or more actions taken,
   determine whether a correlation exists between the contextual parameters and the one or more actions taken across multiple incident responses,
   identify the recommended action of the current public safety policy procedure corresponding to the one or more actions taken as being an outdated action based on the correlation existing between the contextual parameters and the one or more actions taken, and
   update the current public safety policy procedure to include the contextual parameters as incident parameters relating to the recommended action.

4. The system of claim 1, wherein the electronic processor is further configured to:
   display a map of a location of the incident response in the second window.

5. The system of claim 1, wherein the one or more callout boxes is sized to fit within the second window without obscuring any text of the list of actions displayed in the second window.

6. A method for generating a structured graphical user interface for improving accuracy of determining violations of public safety policy procedure and effect of such violations on results of an incident, the method comprising:

generating, using an electronic processor, a graphical user interface including a first window, a second window, and a third window on a display, wherein the first window is displayed adjacent the second window and the third window is displayed below the second window in the graphical user interface, display a list of incident responses in the first window, the list of incident responses including a first timestamped list of a plurality of incident responses performed over a time period, receive a first user selection of an incident response from the list of incident responses in the first window, display a list of actions taken in the incident response in the second window in response to receiving the first user selection, the list of actions taken including a second time stamped list of a plurality of actions taken in the incident response, generate, in the second window, one or more callout boxes including a pointer to one or more actions taken falling outside a current public safety policy procedure for an incident type of the incident response from the list of actions taken, the one or more callout boxes sized to fit within the second window, provide, in the one or more callout boxes, a link to an address of a recommended action of the current public safety policy procedure corresponding to the one or more actions taken, receive a second user selection of an action taken from the list of actions taken, display video data relating to the action taken in the third window in response to the second user selection, and display biometric information of a public safety officer performing the action taken in the third window adjacent the video data in response to the second user selection.

7. The method of claim 6, further comprising:
determining whether one or more results of the one or more actions taken fall within an acceptable results range;
identifying the recommended action of the current public safety policy procedure corresponding to the one or more actions taken as being an outdated action based on the one or more results falling within the acceptable results range; and
identifying a training to be provided to a public safety officer taking the one or more actions taken when the one or more results of the one or more actions taken does not fall within the acceptable results range.

8. The method of claim 6, further comprising:
determining, using the electronic processor, contextual parameters associated with the one or more actions taken;
determining, using the electronic processor, whether a correlation exists between the contextual parameters and the one or more actions taken across multiple incident responses;
identifying, using the electronic processor, the recommended action of the current public safety policy procedure corresponding to the one or more actions taken as being an outdated action based on the correlation existing between the contextual parameters and the one or more actions taken; and updating, using the electronic processor, the current public safety policy procedure to include the contextual parameters as incident parameters relating to the recommended action.

9. The method of claim 8, further comprising:
displaying the updated current public safety policy procedure in the graphical user interface.

10. The method of claim 8, wherein the contextual parameters include one or more selected from a group consisting of a location of the incident, an experience of a public safety officer corresponding to the incident type, and a training associated with a public safety officer dispatched to the incident response.

11. The method of claim 6, wherein the data includes one or more selected from a group consisting of text communications, video data, audio data, public safety officer biometric data, weapon data, weather/environmental data, and traffic data.

12. The method of claim 6, wherein the one or more callout boxes is sized to fit within the graphical user interface without obscuring any text of the plurality of actions taken during the incident response.

13. A command server for generating a structured graphical user interface for improving accuracy of determining violations of public safety policy procedure and effect of such violations on results of an incident, the command server comprising:

a transceiver configured to communicate with an incident response device;

a memory storing current public safety policy procedures for a plurality of incident types; and an electronic processor electrically coupled to the transceiver and the memory and configured to:

generate a graphical user interface including a first window, a second window, and a third window on a display, wherein the first window is displayed adjacent the second window and the third window is displayed below the second window in the graphical user interface, display a list of incident responses in the first window, the list of incident responses including a first timestamped list of a plurality of incident responses performed over a time period, receive a first user selection of an incident response from the list of incident responses in the first window, display a list of actions taken in the incident response in the second window in response to receiving the first user selection, the list of actions taken including a second time stamped list of a plurality of actions taken in the incident response, generate, in the second window, one or more callout boxes including a pointer to one or more actions taken falling outside a current public safety policy procedure for an incident type of the incident response from the list of actions taken, the one or more callout boxes sized to fit within the second window, provide, in the one or more callout boxes, a link to an address of a recommended action of the current public safety policy procedure corresponding to the one or more actions taken, receive a second user selection of an action taken from the list of actions taken, display video data relating to the action taken in the third window in response to the second user selection, and display biometric information of a public safety officer performing the action taken in the third window adjacent the video data in response to the second user selection.

14. The command server of claim 13, wherein the electronic processor is further configured to:
   determine whether one or more results of the one or more actions taken fall within an acceptable results range; and
   identify the recommended action of the current public safety policy procedure corresponding to the one or more actions taken as being an outdated action based on the one or more results falling within the acceptable results range; and
   identify a training to be provided to a public safety officer taking the one or more actions taken when the one or more results of the one or more actions taken does not fall within the acceptable results range.

15. The command server of claim 13, wherein the electronic processor is further configured to:
   determine contextual parameters associated with the one or more actions taken;
   determine whether a correlation exists between the contextual parameters and the one or more actions taken across multiple incident responses;
   identify the recommended action of the current public safety policy procedure corresponding to the one or more actions taken as being an outdated action based on the correlation existing between the contextual parameters and the one or more actions taken; and
   update the current public safety policy procedure to include the contextual parameters as incident parameters relating to the recommended action.

16. The command server of claim 15, wherein the electronic processor is further configured to:
   display the updated current public safety policy procedure in the graphical user interface.

17. The command server of claim 15, wherein the contextual parameters include one or more selected from a group consisting of a location of the incident, an experience of a public safety officer corresponding to the incident type, and a training associated with a public safety officer dispatched to the incident response, and wherein the data includes one or more selected from a group consisting of text communications, video data, audio data, public safety officer biometric data, weapon data, weather/environmental data, and traffic data.

18. The command server of claim 13, wherein the one or more callout boxes is sized to fit within the graphical user interface without obscuring any text of the plurality of actions taken during the incident response.

* * * * *